United States Patent
Chan et al.

(10) Patent No.: US 12,204,626 B2
(45) Date of Patent: *Jan. 21, 2025

(54) USER IDENTIFICATION WITH BLENDED RESPONSE FROM DUAL-LAYER IDENTIFICATION SERVICE

(71) Applicant: MASTERCARD TECHNOLOGIES CANADA ULC, Vancouver (CA)

(72) Inventors: Sik Suen Chan, Richmond (CA); Anton Laptiev, Vancouver (CA); Perry McGee, Vancouver (CA); Carrie Ka Lai Cheung, Vancouver (CA); Parin Prashant Shah, Burnaby (CA); Hanhan Wu, Surrey (CA); Cristian Frentiu, Port Coquitlam (CA)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/407,029

(22) Filed: Jan. 8, 2024

(65) Prior Publication Data

US 2024/0160713 A1    May 16, 2024

Related U.S. Application Data

(63) Continuation of application No. 17/490,283, filed on Sep. 30, 2021, now Pat. No. 11,907,350.
(Continued)

(51) Int. Cl.
*G06F 21/32*    (2013.01)
*G06F 21/31*    (2013.01)
*G06F 21/40*    (2013.01)

(52) U.S. Cl.
CPC ............ *G06F 21/32* (2013.01); *G06F 21/316* (2013.01); *G06F 21/40* (2013.01); *G06F 2221/2111* (2013.01); *G06F 2221/2141* (2013.01)

(58) Field of Classification Search
CPC ........ G06F 21/32; G06F 21/316; G06F 21/40; G06F 222/2111; G06F 2221/2141
(Continued)

(56) References Cited

U.S. PATENT DOCUMENTS 4,805,222 A    2/1989    Young et al.
7,706,574 B1   4/2010    Ross
(Continued)

FOREIGN PATENT DOCUMENTS

WO    9723816 A1    7/1997
WO    2013006071 A1    1/2013

OTHER PUBLICATIONS

European Patent Office Extended European Search Report for Application No. 21873770.8, dated May 6, 2024 (9 pages).
(Continued)

*Primary Examiner* — Sargon N Nano
(74) *Attorney, Agent, or Firm* — Michael Best & Friedrich LLP

(57) ABSTRACT

User identification with blended response from dual-layer identification service. In one embodiment, a server comprising an electronic processor configured to detect an access request by a user of a user interface device, retrieve a plurality of input profile records from an input profile record repository, perform an identification of the user with one or more passive biometrics models and the plurality of input profile records that are retrieved, generate an identification response and an additional identification request based on an outcome of the identification of the user, control the com-
(Continued)

munication interface to transmit the additional identification request to the second server via the network, receive a second identification response from the second server, and generate a blended response by modifying one or more characteristics of the identification response with the second identification response, the blended response indicating the identification of the user.

20 Claims, 3 Drawing Sheets

Related U.S. Application Data

(60) Provisional application No. 63/085,591, filed on Sep. 30, 2020, provisional application No. 63/085,598, filed on Sep. 30, 2020.

(58) Field of Classification Search
USPC .......................................... 726/4, 17, 18, 19
See application file for complete search history.

(56) References Cited

U.S. PATENT DOCUMENTS

| | | | |
|---|---|---|---|
| 9,185,095 B1* | 11/2015 | Moritz | ................ H04L 63/0861 |
| 9,516,035 B1 | 12/2016 | Moritz et al. | |
| 10,453,060 B2 | 10/2019 | Kohli | |
| 10,693,650 B2 | 6/2020 | Wease et al. | |
| 10,699,275 B2 | 6/2020 | Allen et al. | |
| 11,303,631 B1* | 4/2022 | Alexanian | .............. G06V 40/50 |
| 2004/0015714 A1 | 1/2004 | Abraham et al. | |
| 2004/0148509 A1 | 7/2004 | Wu et al. | |
| 2004/0187037 A1 | 9/2004 | Checco | |
| 2006/0224898 A1 | 10/2006 | Ahmed | |
| 2006/0271790 A1 | 11/2006 | Chen | |
| 2007/0067853 A1 | 3/2007 | Ramsey | |
| 2008/0306872 A1* | 12/2008 | Felsher | .................. G06Q 10/10 |
| | | | 705/51 |
| 2012/0137340 A1 | 5/2012 | Jakobsson et al. | |
| 2013/0055381 A1 | 2/2013 | Hao et al. | |
| 2015/0019944 A1 | 1/2015 | Kalgi | |
| 2015/0095028 A1* | 4/2015 | Karpey | ................... G10L 17/24 |
| | | | 704/246 |
| 2015/0149244 A1 | 5/2015 | Unser et al. | |
| 2015/0310444 A1* | 10/2015 | Chen | .................... G06Q 20/308 |
| | | | 705/44 |
| 2015/0363785 A1* | 12/2015 | Perez | ..................... G06Q 20/20 |
| | | | 705/44 |
| 2016/0180068 A1 | 6/2016 | Das et al. | |
| 2017/0140141 A1 | 5/2017 | Yan et al. | |
| 2018/0034859 A1 | 2/2018 | Aronowitz et al. | |
| 2018/0096354 A1 | 4/2018 | Kohli | |
| 2019/0156345 A1 | 5/2019 | Chen et al. | |
| 2019/0220583 A1 | 7/2019 | Douglas et al. | |
| 2019/0295054 A1 | 9/2019 | Purves et al. | |
| 2020/0004939 A1* | 1/2020 | Streit | ................. H04L 63/0861 |
| 2020/0014702 A1 | 1/2020 | Dasgupta et al. | |
| 2020/0044851 A1 | 2/2020 | Everson et al. | |
| 2020/0044852 A1 | 2/2020 | Streit | |
| 2020/0134145 A1* | 4/2020 | Bapst | ...................... G06F 21/45 |
| 2020/0334347 A1* | 10/2020 | Hoyos | ................. H04L 63/0861 |
| 2022/0103548 A1* | 3/2022 | McGee | ............... H04L 63/0435 |

OTHER PUBLICATIONS

European Patent Office Extended European Search Report for Application No. 21873771.6, dated Apr. 26, 2024 (9 pages).
International Search Report and Written Opinion for Application No. PCT/CA2021/051365 dated Dec. 10, 2021 (14 pages).
International Search Report and Written Opinion for Application No. PCT/CA2021/051366 dated Dec. 8, 2021 (11 pages).

* cited by examiner

USER IDENTIFICATION WITH BLENDED RESPONSE FROM DUAL-LAYER IDENTIFICATION SERVICE

CROSS-REFERENCE TO RELATED APPLICATION

This application is a continuation of U.S. Non-Provisional application Ser. No. 17/490,283, filed Sep. 30, 2021, which claims the benefit of U.S. Provisional Application No. 63/085,591, filed on Sep. 30, 2020 and U.S. Provisional Application No. 63/085,598, filed on Sep. 30, 2020, the entire contents of which are hereby incorporated by reference.

FIELD

The present disclosure relates generally to user identification. More specifically, the present disclosure relates to user identification with a blended response from a dual-layer identification service.

BACKGROUND

User identification may occur in a variety of different ways. For example, a user may be identified with individual or combinations of distinctive biometrics that are associated with the user. However, a problem with user identification using passive biometrics is that the number of iterations of user identification that are required before a user may be accurately identified is unwarrantably high. For example, user identification using passive biometrics requires ten or more iterations before a user may be accurately identified using passive biometrics. Passive biometrics are biometrics that are derived from the user's interaction with a webpage via a computing device.

SUMMARY

The present disclosure improves user identification using passive biometrics and solves the aforementioned problem by performing user identification with a blended response from a dual-layer identification service. Even if a first identification of a user is unsuccessful with a passive biometrics model, a second identification of the user may be successful using a specified set of device identification rules to modify, or in place of, the first identification.

The first and second identifications of the user may be blended to form a blended response that successfully identifies a user without requiring ten or more iterations to accurately identify the user. For example, the user identification of the present disclosure using passive biometrics may require just two iterations before a user is accurately identified with the dual-layer identification service.

For example, the first identification may be a passive biometric score and two biometric score thresholds (i.e., an upper threshold and a lower threshold). The second identification may be an indication that the user is the same user or a different user (e.g., an IP address of the user's cell phone). The blended response may be the passive biometric score with two modified biometric score thresholds that indicate whether the user is the same user or a different user even when the first identification, by itself, was inconclusive or unsuccessful.

The combination of the first identification and the second identification in the blended response achieves more than the expected sum because the blended response reduces the number of iterations down to just two iterations necessary to accurately identify the user using passive biometrics. While the second identification may be individually used in place of the first identification, the first identification using passive biometrics may take, for example, ten or more iterations to accurately identify the user. In other examples, the passive biometrics may take less than ten iterations to accurately identify the user.

Additionally, the second identification may be used until the first identification is successful. The second identification is an identification with non-behavioral rules (e.g., device-based rules) to assess a likelihood the same user while the first identification uses biometric features (e.g., biometric features derived from typing and device interaction). Therefore, a true identification of a user is achieved faster with the blended response of the present disclosure.

One example of the present disclosure is a server including a communication interface, a memory, and an electronic processor. The communication interface is configured to communicate with a second server via a network. The memory includes an input profile record (IPR) program, an IPR repository, and a dual-layer identification service. The electronic processor, when executing the IPR program, is configured to detect an access request by a user of a user interface device, and retrieve a plurality of input profile records associated with the user from an input profile record repository in the memory in response to detecting the access request of the user, each of the plurality of input profile records including a plurality of user inputs from the user interacting with a webpage or a mobile application. Additionally, when executing the dual-layer identification service, the electronic processor configured to perform an identification of the user with one or more passive biometrics models and the plurality of input profile records that are retrieved, generate an identification response and an additional identification request based on an outcome of the identification of the user with the one or more passive biometrics models and the plurality of input profile records that are retrieved, control the communication interface to transmit the additional identification request to the second server via the network, receive a second identification response from the second server via the communication interface and the network, and generate a blended response by modifying one or more characteristics of the identification response with the second identification response, the blended response indicating the identification of the user.

Another example of the present disclosure includes a method for user identification. The method includes detecting, with an electronic processor, an access request by the user of a user interface device. The method includes retrieving, with the electronic processor, a plurality of input profile records associated with the user from an input profile record repository in a memory in response to detecting the access request of the user, each of the plurality of input profile records including a plurality of user inputs from the user interacting with a webpage or a mobile application. The method includes performing, with the electronic processor, an identification of the user with one or more passive biometrics models and the plurality of input profile records that are retrieved. The method includes generating, with the electronic processor, an identification response and an additional identification request based on an outcome of the identification of the user with the one or more passive biometrics models and the plurality of input profile records that are retrieved. The method includes controlling, with the electronic processor, a communication interface to transmit the additional identification request to a second server via a network. The method includes receiving, with the electronic processor, a second identification response from the second server via the communication interface and the network. The method also includes generating, with the electronic processor, a blended response by modifying one or more characteristics of the identification response with the second identification response, the blended response indicating the identification of the user.

Yet another example of the present disclosure is a system. The system includes a first server and a second server. The first server includes a communication interface, a memory, and an electronic processor. The communication interface is configured to communicate with the second server via a network. The memory includes an input profile record (IPR) program, an IPR repository, and a dual-layer identification service. The electronic processor, when executing the IPR program, configured to detect an access request by a user of a user interface device, and retrieve a plurality of input profile records associated with the user from an input profile record repository in the memory in response to detecting the access request of the user, the plurality of input profile records including a plurality of user inputs from the user interacting with a webpage or a mobile application. Additionally, when executing the dual-layer identification server, the electronic processor configured to perform an identification of the user with one or more passive biometrics models and the plurality of input profile records that are retrieved, generate an identification response and an additional identification request based on an outcome of the identification of the user with the one or more passive biometrics models and the plurality of input profile records that are retrieved, control the communication interface to transmit the additional identification request to the second server via the network, receive a second identification response from the second server via the communication interface and the network, and generate a blended response by modifying one or more characteristics of the identification response with the second identification response, the blended response indicating the identification of the user.

DETAILED DESCRIPTION

Before any embodiments of the present disclosure are explained in detail, it is to be understood that the present disclosure is not limited in its application to the details of construction and the arrangement of components set forth in the following description or illustrated in the following drawings. The present disclosure is capable of other embodiments and of being practiced or of being carried out in various ways.

Figure 1:
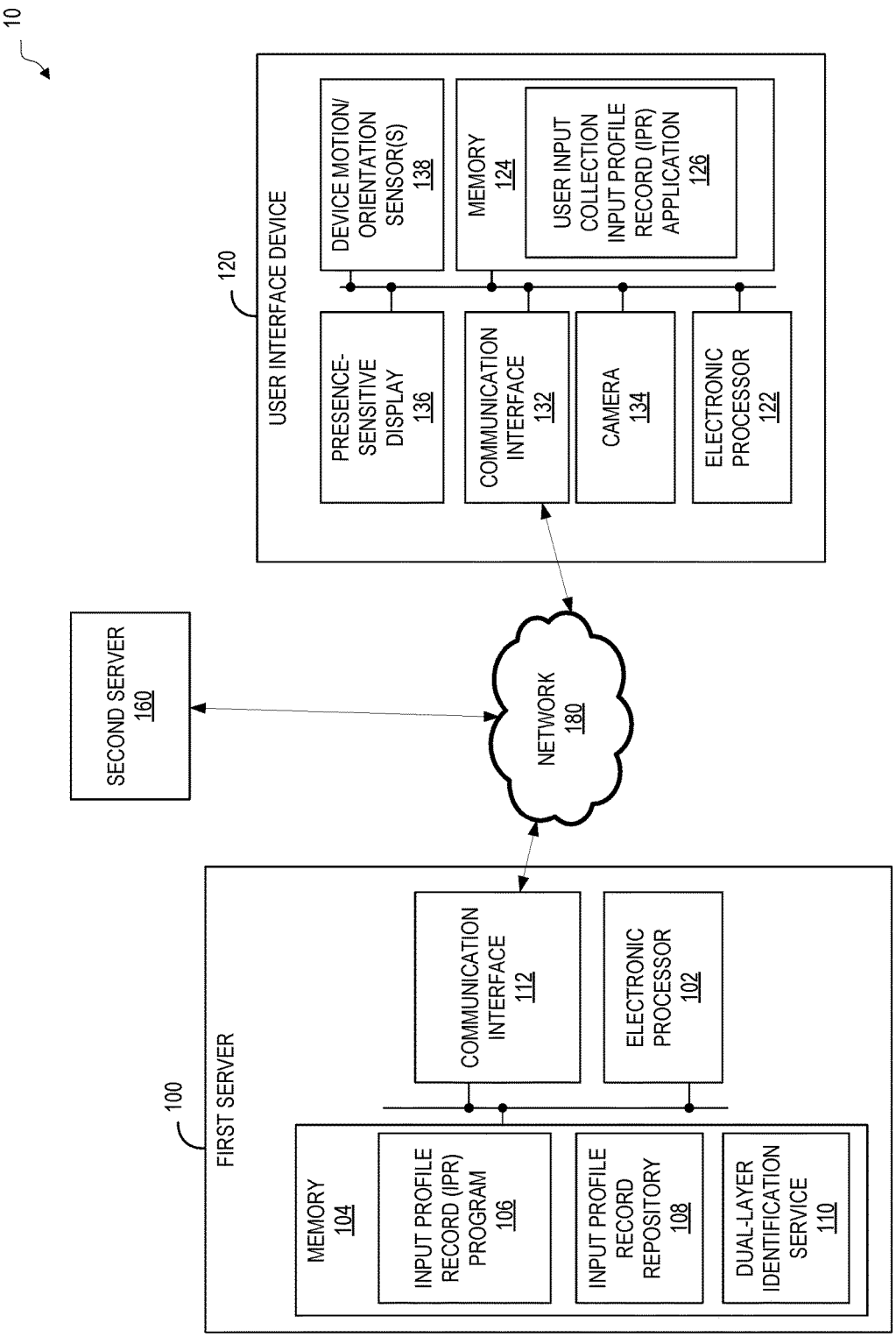
FIG. 1 is a block diagram illustrating a system with user identification using a blended response from a dual-layer identification service, in accordance with various aspects of the present disclosure.

FIG. 1 is a block diagram illustrating a system 10 with user identification using a blended response from a dual-layer identification service. It should be understood that, in some embodiments, there are different configurations from the configuration illustrated in FIG. 1. The functionality described herein may be extended to any number of servers providing distributed processing.

In the example of FIG. 1, the system 10 includes a first server 100, a user interface device 120, a second server 160, and a network 180. The first server 100 includes an electronic processor 102 (for example, a microprocessor or another suitable processing device), a memory 104 (for example, a non-transitory computer-readable storage medium), and a communication interface 112. It should be understood that, in some embodiments, the first server 100 may include fewer or additional components in configurations different from that illustrated in FIG. 1. Also, the first server 100 may perform additional functionality than the functionality described herein. In addition, the functionality of the first server 100 may be incorporated into other servers, e.g., the second server 160. As illustrated in FIG. 1, the electronic processor 102, the memory 104, and the communication interface 112 are electrically coupled by one or more control or data buses enabling communication between the components.

The electronic processor 102 executes machine-readable instructions stored in the memory 104. For example, the electronic processor 102 may execute instructions stored in the memory 104 to perform the functionality described herein.

The memory 104 may include a program storage area (for example, read only memory (ROM)) and a data storage area (for example, random access memory (RAM), and other non-transitory, machine-readable medium). In some examples, the program storage area may store machine-executable instructions regarding an input profile record (IPR) program 106 and a dual-layer identification service 110. In some examples, the data storage area may store data regarding an input profile record repository 108.

The IPR program 106 causes the electronic processor 102 to collect and store input profile records in the input profile record repository 108. Specifically, the IPR program 106 causes the electronic processor 102 to parse the IPR content received from a user interface device, determine biometric features based on the current IPR and historical/older IPRs associated with the user, and perform user identification using a biometric identification algorithm that compares current biometrics features based on a current IPR to the historical biometric features based on a set of historical IPRs. In some examples, a successful user identification may require ten historical IPRs associated with the user to establish a "user profile."

In some examples, the IPR program 106 also causes the electronic processor 102 to update a "user profile" stored in the input profile record repository 108. The "user profile" may be an account/device pair that stores the last x number of IPRs that are updated as a rolling window. In these examples, a single updated user profile may be functionally equivalent to a plurality of input profile records as described herein. Additionally, the user identification with the IPRs is a "passive" identification that does not need to query a user for additional information.

In some examples, the input profile record repository 108 is a central repository including a plurality of input profile records. Each input profile record is associated with a specific user. In some examples, an input profile record stored in the input profile record repository 108 may be updated periodically with the IPR program 106 as described above. The input profile record associated with the user is indicative of an identity of a user over a specific period of time. In other words, the input profile record as described herein solves the aforementioned problems with user identification because the input profile record is a dynamic identification of a user over a specific period of time rather than occurring at certain points in time and fixed to an initial biometric used to set up the user identification.

The dual-layer identification service 110 includes one or more passive biometrics models that may identify a user of the user interface device 120 based on a plurality of input profile records that are stored in the input profile record repository (referred to herein as a "first identification"). In some examples, the dual-layer identification service 110 generates an identification response and an additional identification request from an attempt to identify the user of the user interface device 120 with the one or more passive biometrics models. In these examples, the identification response may indicate a verification of the user's identity or may indicate an inability to verify the user's identity.

Additionally, the dual-layer identification service 110 causes the electronic processor 102 to transmit the additional identification request and device characteristics of the user interface device 120 to the second server 160 via the network 180. The additional identification request requests additional verification of the user of the user interface device 120 that may be combined with the identification response to generate a blended response.

In some examples, a first model of the one or more passive biometrics models may identify the user of the user interface device 120 with a plurality of input profile records, each IPR based on a plurality of user inputs (e.g., user inputs with respect to a username and password) at a login page. Additionally or alternatively, in some examples, a second model of the one or more passive biometrics models may identify the user associated with a plurality of IPRs, each based on a plurality of user inputs (e.g., user inputs with respect to a behavioral one-time-passcode (OTP)) at a multifactor authentication page.

The communication interface 112 receives data from and provides data to devices external to the first server 100, such as the user interface device 120 via the network 180. For example, the communication interface 112 may include a port or connection for receiving a wired connection (for example, an Ethernet cable, fiber optic cable, a telephone cable, or the like), a wireless transceiver, or a combination thereof. In some examples, the network 180 is the Internet.

In the example of FIG. 1, the user interface device 120 includes an electronic processor 122 (for example, a microprocessor or another suitable processing device), a memory 124 (for example, a non-transitory computer-readable storage medium), a communication interface 132, a camera 134, a presence-sensitive display 136, and a device motion/orientation sensor(s) 138. In some examples, the user interface device may be a smartphone, tablet, laptop, or other suitable user interface device with a presence-sensitive display and an orientation sensor. As illustrated in FIG. 1, the electronic processor 122, the memory 124, the communication interface 132, the camera 134, the presence-sensitive display 136, and the device motion/orientation sensor(s) 138 are electrically coupled by one or more control or data buses enabling communication between the components.

The electronic processor 122 executes machine-readable instructions stored in the memory 124. For example, the electronic processor 122 may execute instructions stored in the memory 124 to perform the functionality described herein.

The memory 124 may include a program storage area (for example, read only memory (ROM)) and a data storage area (for example, random access memory (RAM), and other non-transitory, machine-readable medium). The program storage area includes a user input collection and input profile record (IPR) application 126. In some examples, the user input collection and IPR application 126 may be a stand-alone application. In other examples, the user input collection and IPR application 126 is a feature that is part of a separate application (e.g., the user input collection and IPR application 126 may be included as part of a camera application, a banking application, or other suitable application).

The user input collection and IPR application 126 causes the electronic processor 122 to collect user inputs, i.e., user interactions, from a user relative to a mobile application (e.g., time to fill data field entries, use of specific autofill, or other suitable user inputs) of the user interface device 120 and generate an input profile record (IPR) based on the user inputs (also referred to as a "mobile platform"). The user input collection and IPR program 106 may also cause the electronic processor 122 to collect user inputs at a particular website (e.g., time to fill data field entries, use of specific autofill, or other suitable user inputs) and generate (or update) the input profile record based on these user inputs (also referred to as a "web platform").

In some examples, the user input collection and IPR application 126 causes the electronic processor 122 to collect user inputs with respect to the presence-sensitive display 136 (e.g., type of keyboard, typing speed, use of patterns, or other suitable user inputs (see Tables 1-3)). In these examples, the user input collection and IPR application 126 may also cause the electronic processor 122 to output the generated IPR to the server 100 via the communication interface 132 and the network 180. Additionally, in some examples, the user input collection and IPR application 126 may cause electronic processor 122 to control the memory 124 to store the user inputs that are collected and/or the IPR that is generated for a period of time or until the generated IPR is output to the server 100.

In other examples, the user input collection and IPR application 126 causes the electronic processor 122 to collect user inputs with respect to the camera 134 (e.g., facial recognition, user gestures, or other suitable user inputs), which may be part of the mobile platform. In these examples, the user input collection and IPR application 126 may also cause the electronic processor 122 to generate (or update) an IPR based on the aforementioned user inputs and output the IPR to the server 100 via the communication interface 132 and the network 180. Additionally, in some examples, the user input collection and IPR application 126 may cause electronic processor 122 to control the memory 124 to store the user inputs that are collected and/or the IPR that is generated for a period of time or until the generated IPR is output to the server 100.

The communication interface 132 receives data from and provides data to (e.g., generated IPR(s)) devices external to the user interface device 120, i.e., the server 100. For example, the communication interface 132 may include a port or connection for receiving a wired connection (for example, an Ethernet cable, fiber optic cable, a telephone cable, or the like), a wireless transceiver, or a combination thereof.

The camera 134 includes an image sensor that generates and outputs image data of a subject. In some examples, the camera 134 includes a semiconductor charge-coupled device (CCD) image sensor, a complementary metal-oxide-semiconductor (CMOS) image sensor, or other suitable image sensor. The electronic processor 122 receives the image data of the subject that is output by the camera 134.

The presence-sensitive display 136 includes a display screen with an array of pixels that generate and output images. In some examples, the display screen is one of a liquid crystal display (LCD) screen, a light-emitting diode (LED) and liquid crystal display (LCD) screen, a quantum dot light-emitting diode (QLED) display screen, an interferometric modulator display (IMOD) screen, a micro light-emitting diode display screen (mLED), a virtual retinal display screen, or other suitable display screen. The presence-sensitive display 136 also includes circuitry that is configured to detect the presence of the user. In some examples, the circuitry is a resistive or capacitive panel that detects the presence of an object (e.g., a user's finger).

The device motion/orientation sensor(s) 138 is a sensor that detects a movement and/or an orientation of the user interface device 120. In some examples, the device motion/orientation sensor(s) 138 is an accelerometer, gyroscope, magnetometer, or other suitable device motion/orientation sensor that detects the motion and/or orientation of the user interface device 120.

It should be understood that, in some embodiments, the server 100 may include fewer or additional components in configurations different from that illustrated in FIG. 1. Also, the server 100 may perform additional functionality than the functionality described herein. In addition, some of the functionality of the user interface device 120 (for example, the IPR generation) may be incorporated into other servers (e.g., incorporated into the server 100). Likewise, some of the functionality of the server 100 may be incorporated into the user interface device 120 (for example, the user identification).

The second server 160 is similar to the first server 100. For example, the second server 160 includes an electronic processor (for example, a microprocessor or another suitable processing device), a memory (for example, a non-transitory computer-readable storage medium), and a communication interface. It should be understood that, in some embodiments, the second server 160 may include fewer or additional components in configurations different from the first server 100 that is illustrated in FIG. 1. Also, the second server 160 may perform additional or different functionality than the functionality described herein with respect to the first server 100. In other embodiments, the functionality described herein with respect to the second server 160 may be performed by the first server 100 and the second server 160 may be omitted.

The second server 160 may receive the additional identification request from the first server 100 via the network 180. The additional identification request from the first server 100 causes the second server 160 to perform a second identification of the user based on a set of device identification rules. The second identification of the user is not based on a biometric model (e.g., the one or more passive biometrics models as described above). Instead, the second identification is based on a set of device identification rules as set forth in Table 1 below.

TABLE 1

Device Identification Rules

| Rule Category | Rules in Category | Inequality | Threshold at which to trigger category |
|---|---|---|---|
| Frequent Rules | frequent device<br>frequent city<br>frequent state | >= | 3 |
| Known Rules | known device<br>known geolocation<br>normal user input | >= | 2 |
| Last 7 Days Location Rules | last 7 days city<br>last 7 days country<br>last 7 days state<br>last 7 days zip code | >= | 4 |
| Last 7 Days Lat Long Rules | last 7 days latitude longitude 1000 km<br>last 7 days latitude longitude 100 km<br>last 7 days latitude longitude 10 km | >= | 3 |
| Last 7 Days Device Rules | last 7 days DFP2<br>last 7 days DID<br>last 7 days useragent<br>last 7 days IP<br>last 7 days IP org<br>last 7 days endpoint<br>last 7 days UDID<br>last 7 days browser name | >= | 4 |
| Unfamiliar Rules | unfamiliar device<br>unfamiliar state | <= | 0 |
| Login Familiarity Rules | login frequency familiarity<br>login daytime familiarity | >= | 1 |
| Usual WPM Rules | account usual WPM<br>endpoint usual WPM<br>device usual WPM | >= | 2 |
| Anomalous Input Rules | no user interaction<br>input anomaly | <= | 0 |
| Fraud Associated Rules | fraud associated account id<br>fraud associated email domain<br>fraud associated endpoint<br>fraud associated IP<br>negative cloud account id reputation<br>negative cloud email domain reputation | <= | 0 |

TABLE 1-continued

Device Identification Rules

| Rule Category | Rules in Category | Inequality | Threshold at which to trigger category |
|---|---|---|---|
| | negative cloud endpoint reputation | | |
| | negative cloud IP reputation | | |
| Frequent Anomalous Rules | frequent anomalous device<br>frequent anomalous city<br>frequent anomalous state | <= | 0 |
| Known Anomalous Rules | known anomalous device<br>known anomalous geolocation | <= | 0 |
| Last 7 Days Anomalous Device Rules | last 7 days anomalous DFP2<br>last 7 days anomalous DID<br>last 7 days anomalous useragent<br>last 7 days anomalous IP<br>last 7 days anomalous IP org<br>last 7 days anomalous endpoint<br>last 7 days anomalous UDID<br>last 7 days anomalous browser name | <= | 0 |
| Last 7 Days Anomalous Lat Long Rules | last 7 days anomalous latitude longitude 1000 km<br>last 7 days anomalous latitude longitude 100 km<br>last 7 days anomalous latitude longitude 10 km | <= | 0 |
| Last 7 Days Anomalous Location Rules | last 7 days anomalous city<br>last 7 days anomalous country<br>last 7 days anomalous state<br>last 7 days anomalous zip code | <= | 0 |
| Anomalous Login Familiarity Rules | anomalous login frequency familiarity<br>anomalous login daytime familiarity | <= | 0 |

In Table 1, the frequent rules category includes a frequent device rule, a frequent city rule, and a frequent state rule. The frequent device rule looks for successful logins using same device in last 4 weeks associated with the account. The device includes device identifier (DID) and device fingerprint (DFP). The frequent city rule looks for successful logins using same IP city in last 4 weeks associated with the account. The frequent state rule looks for successful logins using same IP state in last 4 weeks associated with the account. The frequent rules category triggers with a threshold equal to three.

However, while the threshold may be interpreted as "equal to three," the thresholds in Table 1 are defined according to inequality. The use of inequality makes an optimization process for each client easier than the use of equality. All the thresholds described herein may be interpreted from the perspective of equality for ease of understanding, however, the thresholds are defined from the perspective of inequality.

In Table 1, the known rules category includes a known device rule, a known geolocation rule, and a normal user input rule. The known device rule uses several device anchors and several time periods to calculate a percentage of successful logins associated with the account (e.g., 30% or more successful logins). The known geolocation rule uses several geo anchors and several time periods to calculate a percentage of successful logins associated with the account (e.g., 30% or more successful logins). The normal user input rule looks into widget cycle data to see if the user input is "normal" and is not account based. The known rules category triggers with a threshold greater than or equal to two.

In Table 1, the last 7 days location rules category includes a last 7 days city rule, a last 7 days country rule, a last 7 days state rule, and a last 7 days zip code rule. These rules check whether there are successful logins in last 7 days by the same anchor (i.e., city, country, state, or zip code) associated with the account. The last 7 days location rules category triggers with a threshold greater than or equal to four.

In Table 1, the last 7 days latitude longitude rules category includes a last 7 days latitude longitude 1000 km rule, a last 7 days latitude longitude 100 km rule, and a last 7 days latitude longitude 10 km rule. These rules check whether there are successful logins in last 7 days by the same anchor (i.e., a latitude and longitude within a distance of 1000 km, 100 km, or 10 km) associated with the account. The last 7 days latitude longitude rules category triggers with a threshold greater than or equal to three.

In Table 1, the last 7 days device rules category includes a last 7 days DFP2 rule, a last 7 days DID rule, a last 7 days useragent rule, a last 7 days IP rule, a last 7 days IP org rule, a last 7 days endpoint rule, a last 7 days UDID rule, and a last 7 days browser name rule. These rules check whether there are successful logins in last 7 days by the same anchor (i.e., a second device fingerprint (DFP2), a device identifier (DID), a device's user agent, a device's IP, an organization of the device's IP, a device's endpoint, a device's universal device identifier (UDID), a name of the device's web browser) associated with the account. The last 7 days device rules category triggers with a threshold greater than or equal to four.

In Table 1, the unfamiliar rules category includes an unfamiliar device rule and an unfamiliar state rule. The unfamiliar device rule looks for zero successful logins of the device anchor defined and associated with the account. The unfamiliar state rule looks for zero successful logins of the state anchor defined and associated with the account. The unfamiliar rules category triggers with a threshold equal to zero.

In Table 1, the login familiarity rules category includes a login frequency familiarity rule and a login daytime familiarity rule. The login frequency familiarity rule checks whether current login is occurring within a time window based on their successful login frequency. The login daytime familiarity rule checks whether current login is during a time of week that the user most frequently successfully logs in. The login familiarity rules category triggers with a threshold greater than or equal to one.

In Table 1, the usual words-per-minute (WPM) rules category includes an account usual WPM rule, an endpoint usual WPM rule, and a device usual WPM rule. The account usual WPM rule looks at whether the observed WPM is within a certain bound associated to the account, and the bound is set pretty wide +/−40 WPM currently (i.e. "outliers"). The endpoint usual WPM rule looks at whether observed WPM is within a certain bound associated to the endpoint, and the bound is set pretty wide +/−40 WPM currently (i.e. "outliers"). The device usual WPM rule looks at whether observed WPM is within a certain bound associated to the device, and the bound is set pretty wide +/−40 WPM currently (i.e. "outliers"). The usual WPM rules category triggers with a threshold greater than or equal to two.

In Table 1, the anomalous rules category includes a no user interaction rule and an input anomaly rule. The no user interaction rule looks for any user interaction associated with the transaction by looking at various input methods such as keyboard typing, mouse clicks and form focus events, and triggers when all of the input methods indicate no activity detected. The input anomaly rule looks at whether an anomalous input was observed during the request. The anomalous rules category triggers with a threshold equal to zero.

In Table 1, the fraud associated rules category includes a fraud associated account id rule, a fraud associated email domain rule, a fraud associated endpoint rule, a fraud associated IP rule, a negative cloud account id reputation rule, a negative cloud email domain reputation rule, a negative cloud endpoint reputation rule, and a negative cloud IP reputation rule. The a fraud associated account id rule, the fraud associated email domain rule, the fraud associated endpoint rule, and the fraud associated IP rule looks at whether the anchor (i.e., the account id, the email domain, the endpoint (DFP2 and IP), or the IP) has been associated with recent fraud. The negative cloud account id reputation rule, the negative cloud email domain reputation rule, the negative cloud endpoint reputation rule, and the negative cloud IP reputation rule looks at whether the anchor (i.e., the account id, the email domain, the endpoint (DFP2 and IP), or the IP) has been associated with negative activity globally. The fraud associated rules category triggers with a threshold equal to zero.

In Table 1, the frequent anomalous rules category includes a frequent anomalous device rule, a frequent anomalous city rule, and a frequent anomalous state rule. The frequent anomalous rules category looks for three or more red scored logins from an anchor (i.e., device, city, and State) in the past four weeks. As described herein, a "red scored login" is a high risk or likely fraudulent login. The frequent anomalous rules category triggers with a threshold equal to zero.

In Table 1, the known anomalous rules category includes a known anomalous device rule and a known anomalous geolocation rule. The known anomalous rules category uses several anchors (i.e., device or geographical anchors) and several time periods to look for a percentage of red scored logins associated with the account in the past four weeks. The known anomalous rules category triggers with a threshold equal to zero.

In Table 1, the last 7 days anomalous location rules category includes a last 7 days city rule, a last 7 days country rule, a last 7 days state rule, and a last 7 days zip code rule. These rules check whether there are one or more red scored login in last 7 days by the same anchor (i.e., city, country, state, or zip code) associated with the account. The last 7 days anomalous location rules category triggers with a threshold equal to zero.

In Table 1, the last 7 days anomalous latitude longitude rules category includes a last 7 days latitude longitude 1000 km rule, a last 7 days latitude longitude 100 km rule, and a last 7 days latitude longitude 10 km rule. These rules check whether there are one or more red scored logins in last 7 days by the same anchor (i.e., a latitude and longitude within a distance of 1000 km, 100 km, or 10 km) associated with the account. The last 7 days anomalous latitude longitude rules category triggers with a threshold equal to zero.

In Table 1, the last 7 days anomalous device rules category includes a last 7 days DFP2 rule, a last 7 days DID rule, a last 7 days useragent rule, a last 7 days IP rule, a last 7 days IP org rule, a last 7 days endpoint rule, a last 7 days UDID rule, and a last 7 days browser name rule. These rules check whether there are one or more red scored logins in last 7 days by the same anchor (i.e., a second device fingerprint (DFP2), a device identifier (DID), a device's user agent, a device's IP, an organization of the device's IP, a device's endpoint, a device's universal device identifier (UDID), a name of the device's web browser) associated with the account. The last 7 days anomalous device rules category triggers with a threshold equal to zero.

In Table 1, the anomalous login familiarity rules category includes a login frequency familiarity rule and a login daytime familiarity rule. The login frequency familiarity looks for a red scored login frequency pattern of a device associated with the account. The login daytime familiarity rule looks for a red scored login time pattern of a device associated with the account. The anomalous login familiarity rules category triggers with a threshold equal to zero.

The second server 160 performs the second identification and confirms it is the same user when the combined categories triggered is greater than or equal to an upper "same user" threshold. For example, an upper threshold of fourteen categories.

Conversely, the second server 160 performs the second identification and confirms it is a different user when the combined categories triggered is less than or equal to a lower "different user" threshold that is different from the upper threshold. For example, a lower threshold of eleven categories.

Lastly, the second server 160 designates a user as an "unknown user" when the combined categories triggered is between the upper threshold and the lower threshold. For example, twelve or thirteen categories when the upper threshold is fourteen categories and the lower threshold is eleven categories.

When the first server 100 cannot perform the first identification (i.e., identification with passive biometric models), then the first server 100 relies upon the second server 160 to perform the second identification on whether the user is the same or different users. For example, when the first server 100 cannot perform the first identification for some reason (e.g., the user uses auto-fill), then the first server 100 relies on the second identification performed by the second server 160 to determine whether the user is the same or different users.

When the first server 100 can perform the first identification (i.e., identification with passive biometric models), then the first server 100 relies upon the second server 160 to increase or decrease the biometric thresholds associated with the passive biometric model. For example, when the first identification is available and the "Unfamiliar Rules category" is triggered, then the first server 100 may increase an upper biometric threshold by 2% and increase a lower biometric threshold by 5%. In other words, an "unfamiliar" event changes the thresholds of the passive biometric model to reduce the chance of a same user match.

In a different example, when the first identification is available and the "Frequent Rules category" is triggered, then the first server 100 may lower the upper biometric threshold by 4% and decrease the lower biometric threshold by 8%. In other words, an "frequent" event changes the scoring thresholds of the passive biometric model to increase the chance of a same user match.

In some examples, the upper and lower biometric thresholds are numbers between 1 and 0, and the upper biometric threshold is a larger number than the lower biometric threshold. When a passive biometric score from one or more passive biometric models is greater than the upper biometric threshold, then the passive biometric score indicates it is a same user. When a passive biometric score from one or more passive biometric models is lower than the lower biometric threshold, then the passive biometric score indicates it is a different user. When a passive biometric score from one or more passive biometric models is between the upper biometric threshold and the lower biometric threshold, then the passive biometric score is deemed undetermined.

The second identification performed by the second server 160 helps to reduce the instances that the passive biometric score is deemed undetermined by helping to adjust the passive biometric score. Additionally, the second identification performed by the second server 160 helps to identify the user in the event the passive biometric score is either unavailable or deemed undetermined.

Figure 2:
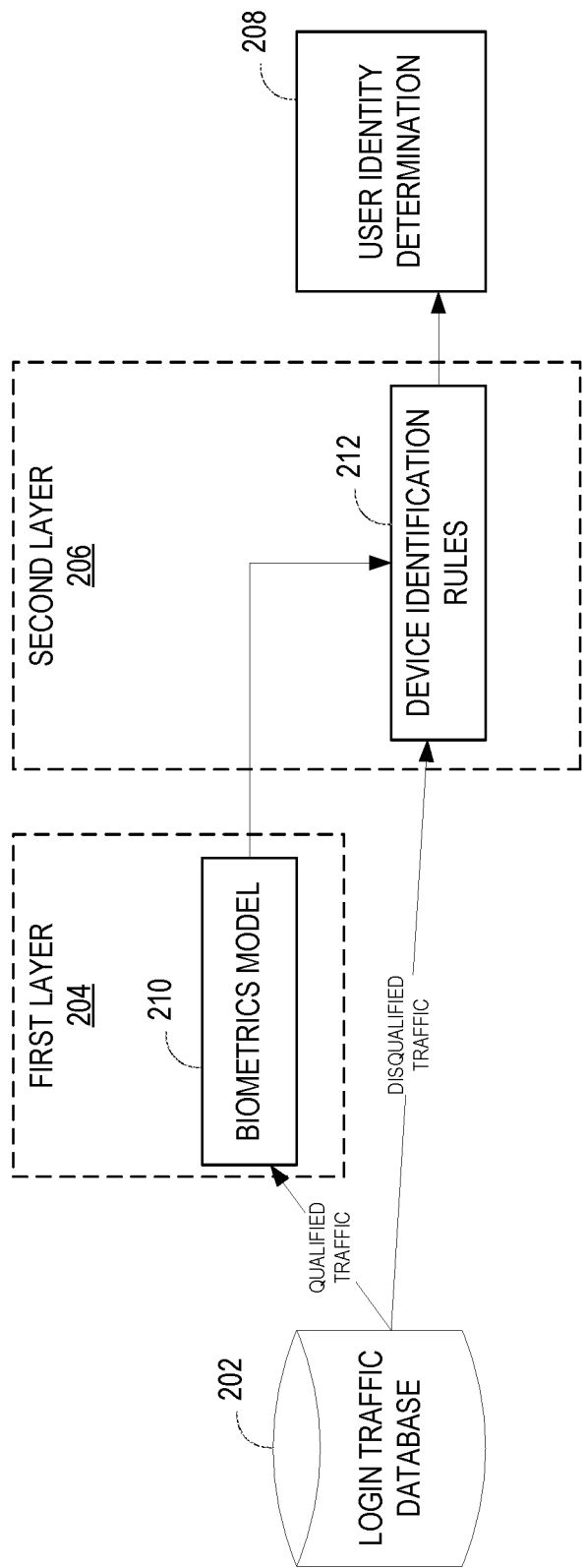
FIG. 2 is a flow diagram illustrating the dual-layer service of FIG. 1, in accordance with various aspects of the present disclosure.

FIG. 2 is a flow diagram illustrating the dual-layer service 110 of FIG. 1, in accordance with various aspects of the present disclosure. FIG. 2 is described with respect to FIG. 1. As illustrated in FIG. 2, the dual-layer service 110 includes login traffic database 202, a first layer 204, a second layer 206, and a user identity determination 208.

The first layer 204 includes qualified login traffic from the login traffic database 202 that is processed by the first server 100 with a biometrics model 210 (e.g., an active biometrics model or a passive biometrics model) to output a response for user identification in the second layer 206. In some examples, the passive biometrics model is at least one of a login information passive biometrics model or a one-time-passcode (OTP) passive biometrics model.

The second layer 206 includes the response from the first layer 205 that is processed by the second server 160 with device identification rules 212 (for example, the device identification rules set forth in Table 1). The device identification rules 212 may be used to enhance the biometrics score that is part of the identification response of the first server 100, where the first server 100 generates a blended identification response that classifies a user as "match," "no-match," or "undetermined" in the user identity determination 208. For example, if many "unfamiliar device" related rules are triggered in the device identification rules 212, the biometric thresholds are increased, whereas if many "familiar device" rules are triggered in the device identification rules 212, the biometric thresholds are decreased. The first server 100 re-analyzes both the biometrics score enhanced with the triggered rules to determine an overall match category for the blended identification response in the user identity determination 208.

Additionally, when the login traffic is disqualified, the disqualified login traffic from the login traffic database 202 is processed directly by the second server 160 with the device identification rules 212 to output an identification response for the user identity determination 208. The disqualified login traffic includes login attempts with auto-filled entries, invalid IPR data, or other login traffic that is disqualified or unsuitable for a biometrics model. In these examples, only triggered rules from the device identification rules 212 will be used to classify whether a user is "match," "no-match," or "undetermined" in the user identity determination 208.

Figure 3:
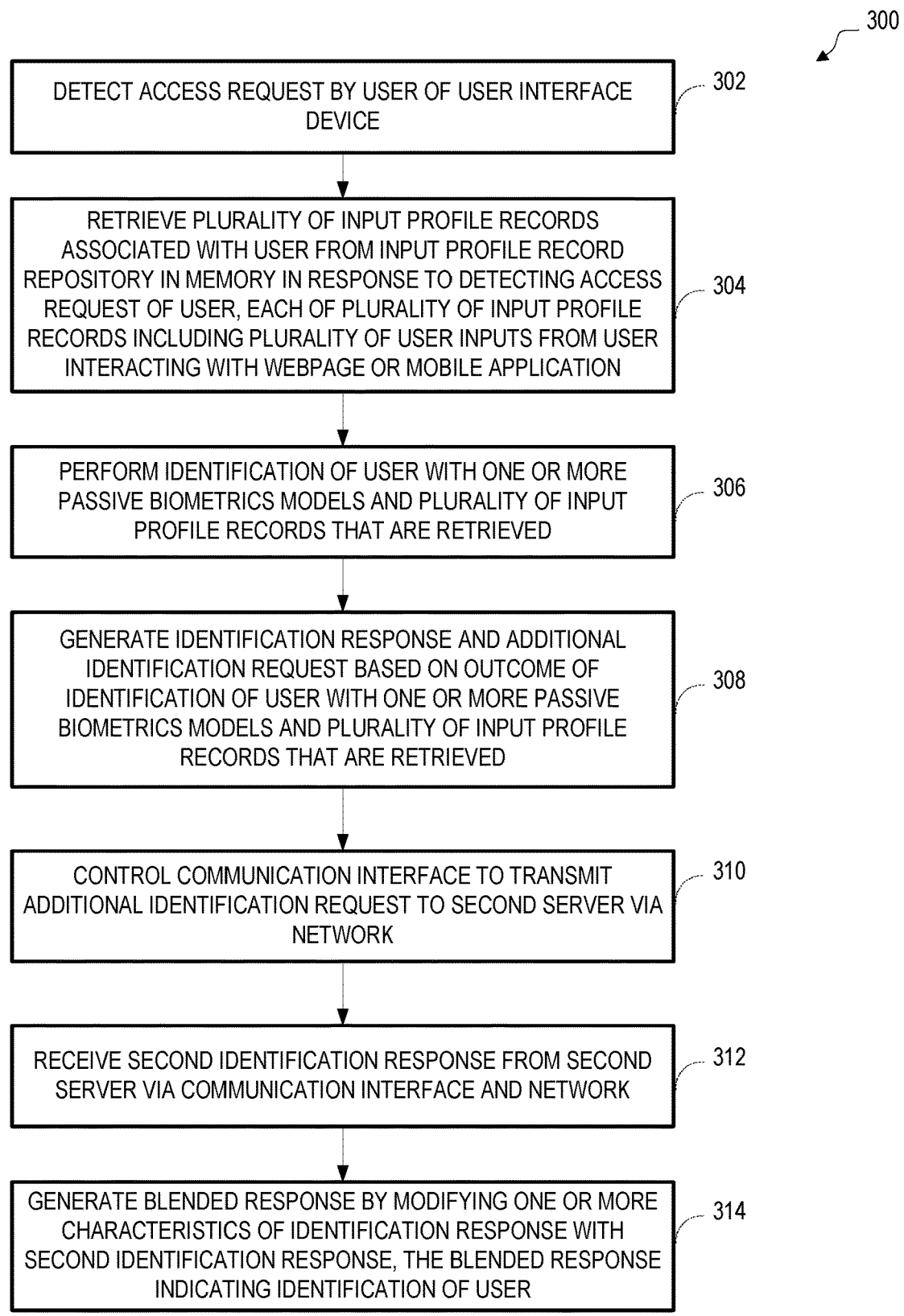
FIG. 3 is a flowchart illustrating a method for identifying a user, in accordance with various aspects of the present disclosure.

FIG. 3 is a flowchart illustrating a method 300 for identifying a user, in accordance with various aspects of the present disclosure. FIG. 3 is described with respect to FIG. 1.

The method 300 includes detecting, with an electronic processor, an access request by a user of a user interface device (at block 302). For example, the electronic processor 102 detects an access request by a user of the user interface device 120 at a login page. Although the access request described herein is a login attempt, the method 300 is not limited to a login attempt. The method 300 is equally applicable to any form of access request, for example, an access request with respect to a remuneration vehicle.

The method 300 includes retrieving, with the electronic processor, a plurality of input profile record associated with the user from an input profile record repository in a memory in response to detecting the access request of the user, each of the plurality of input profile records including a plurality of user inputs from the user interacting with a webpage (at block 304). For example, the electronic processor 102 retrieves a plurality of input profile records associated with the user from the input profile record repository 108 in the memory 104 in response to the electronic processor 102 detecting the access request of the user. Each of the plurality of input profile records includes a plurality of user inputs from the user interacting with a webpage (e.g., one or more previous interactions with the login page or one or more previous interactions with a 3DS challenge page) or a mobile application.

The method 300 includes performing, with the electronic processor, an identification of the user with one or more passive biometrics models and the plurality of input profile records that are retrieved (at block 306). For example, the electronic processor 102 performs an identification of the user with one or more passive biometrics models that are included in the dual-layer identification service 110 and the plurality of input profile records that are retrieved.

The method 300 includes generating, with the electronic processor, an identification response and an additional identification request based on an outcome of the identification of the user with the one or more passive biometrics models and the plurality of input profile records that are retrieved (at block 308). For example, the electronic processor 102 generates an identification response and an additional identification request based on an outcome of the identification of the user with the one or more passive biometrics models included in the dual-layer identification service 110 and the plurality of input profile records that are retrieved.

In some examples, the identification response includes a passive biometric score of the user, an upper biometric threshold, and a lower biometric threshold. The upper biometric threshold being a threshold that indicates the user is the same as a previous user. The lower biometric threshold being a threshold that indicates the user is a different user. Additionally, in some examples, the passive biometric score of the user is skipped entirely when the outcome of the identification of the user is a failed identification of the user using the one or more passive biometrics models.

The method 300 includes controlling, with the electronic processor, a communication interface to transmit the additional identification request to a second server via a network (at block 310). For example, the electronic processor 102 controls the communication interface 112 to transmit the additional identification request with device characteristics of the user interface device 120 to the second server 160 via the network 180.

The method 300 includes receiving, with the electronic processor, a second identification response from the second server via the communication interface and the network (at block 312). For example, the electronic processor 102 receives a second identification response from the second server 160 via the communication interface 112 and the network 180.

The method 300 includes generating, with the electronic processor, a blended response by modifying one or more characteristics of the identification response with the second identification response, the blended response indicating the identification of the user (at block 314). For example, the electronic processor 102 generates a blended response by modifying one or more characteristics of the identification response with the second identification response, the blended response indicating the identification of the user.

In some examples, the blended response includes the passive biometric score of the user, a modified upper biometric threshold, and a modified lower biometric threshold. The modified upper biometric threshold being a threshold that indicates the user is the same as a previous user and is increased or decreased based on the second identification response. The modified lower biometric threshold being a threshold that indicates the user is a different user and is increased or decreased based on the second identification response.

Additionally, in some examples, the passive biometric score of the user is skipped when the outcome of the identification of the user is a failed identification of the user using the one or more passive biometrics models. In other words, the second identification response replaces the null value of the passive biometric score to result in the blended response indicating the user is the same as a previous user.

In some examples, the method 300 may further include granting or denying access according to the access request based on the blended response. In other examples, the method 300 may further include outputting the blended response to control a third device to grant or deny access according to the access request based on the blended response.

In some examples, the additional identification request indicates to the second server 160 that the outcome of the identification of the user is a successful identification of the user. In these examples, the additional identification request is a request for an additional user identification based on device identification rules that enhances the successful identification of the user.

In some examples, the device identification rules are divided into a plurality of categories, the additional user identification is based on categories of the device identification rules that are triggered, and modifying the one or more characteristics of the identification response with the second identification response further includes adjusting biometric thresholds of the one or more passive biometrics models based on the categories of the device identification rules that are triggered.

In some examples, the additional identification request indicates to the second server 160 that the outcome of the identification of the user is a failed identification of the user. In these examples, the additional identification request is a request for an additional user identification based on device identification rules.

In some examples, the device identification rules are divided into a plurality of categories. In these examples, the additional user identification is based on categories of the device identification rules that are triggered.

In some examples, the plurality of categories may include a frequent rules category, a known rules category, last 7 days location rules category, last 7 days latitude and longitude rules category, last 7 days device rules category, unfamiliar rules category, login familiarity rules category, usual words-per-minute (WPM) rules category, anomalous input rules category, fraud associated rules category, frequent anomalous rules category, known anomalous rules category, last 7 days anomalous device rules category, last 7 days anomalous latitude and longitude rules category, last 7 days anomalous location rules category, and an anomalous login familiarity rules category.

Additionally, in some examples, the frequent rules category has a trigger threshold of three or more rules, wherein the known rules category has a trigger threshold of two or more rules, wherein the last 7 days location rules category has a trigger threshold of four or more rules, wherein the last 7 days latitude and longitude rules category has a trigger threshold of three or more rules, wherein the last 7 days device rules category has a trigger threshold of four or more rules, unfamiliar rules category has a trigger threshold of zero rules, wherein the login familiarity rules category has a trigger threshold of one or more rules, wherein the usual words-per-minute (WPM) rules category has a trigger threshold of two or more rules, wherein the anomalous input rules category has a trigger threshold of zero rules, wherein the fraud associated rules category has a trigger threshold of zero rules, wherein the frequent anomalous rules category has a trigger threshold of zero rules, wherein the known anomalous rules category has a trigger threshold of zero rules, wherein the last 7 days anomalous device rules category has a trigger threshold of zero rules, wherein the last 7 days anomalous latitude and longitude rules category has a trigger threshold of zero rules, wherein the last 7 days anomalous location rules category has a trigger threshold of zero rules, and wherein the anomalous login familiarity rules category has a trigger threshold of zero rules.

Additionally, in some examples, the second identification response from the additional user identification indicates the user is a same user when the plurality of categories has a first combined total of greater than or equal to a first number of categories triggered. Lastly, in some examples, the second identification response from the additional user identification indicates the user is a different user when the plurality of categories has a second combined total of less than or equal to a second number of categories triggered that is less than the first number.

Thus, the present disclosure provides, among other things, user identification with a blended response from a dual-layer identification service. Various features and advantages of the invention are set forth in the following claims.

What is claimed is:

1. A server comprising:
a communication interface configured to communicate with a second server via a network;
a memory including an input profile record (IPR) program, an IPR repository, and a dual-layer identification service; and
an electronic processor, when executing the IPR program, configured to:
   detect an access request by a user of a user interface device, and
   retrieve a plurality of input profile records associated with the user from an input profile record repository in the memory in response to detecting the access request of the user, each of the plurality of input profile records including a plurality of user inputs from the user interacting with a webpage or mobile application,
wherein, when executing the dual-layer identification service, the electronic processor configured to:
   perform an identification of the user with one or more passive biometrics models and the plurality of input profile records that are retrieved,
   generate an identification response and an additional identification request based on an outcome of the identification of the user with the one or more passive biometrics models and the plurality of input profile records that are retrieved,
   control the communication interface to transmit the additional identification request to the second server via the network,
   receive a second identification response from the second server via the communication interface and the network, and
   generate a blended response by modifying one or more characteristics of the identification response with the second identification response, the blended response indicating the identification of the user,
wherein the additional identification request indicates to the second server that the outcome of the identification of the user is a failed identification of the user, and wherein the additional identification request is a request for an additional user identification based on device identification rules.

2. The server of claim 1, wherein the additional identification request indicates to the second server that the outcome of the identification of the user is a successful identification of the user, and wherein the additional identification request is a request for an additional user identification based on device identification rules that enhances the successful identification of the user.

3. The server of claim 1, wherein the device identification rules are divided into a plurality of categories, wherein the additional user identification is based on all of the plurality of categories of the device identification rules that are triggered, and wherein modifying the one or more characteristics of the identification response with the second identification response further includes adjusting biometric thresholds of the one or more passive biometrics models based on the categories of the device identification rules that are triggered.

4. The server of claim 1, wherein the device identification rules are divided into a plurality of categories, and wherein the additional user identification is based on all of the plurality of categories of the device identification rules that are triggered.

5. The server of claim 4, wherein the plurality of categories includes a frequent rules category, a known rules category, last 7 days location rules category, last 7 days latitude and longitude rules category, last 7 days device rules category, unfamiliar rules category, login familiarity rules category, usual words-per-minute (WPM) rules category, anomalous input rules category, fraud associated rules category, frequent anomalous rules category, known anomalous rules category, last 7 days anomalous device rules category, last 7 days anomalous latitude and longitude rules category, last 7 days anomalous location rules category, and an anomalous login familiarity rules category.

6. The server of claim 5, wherein the frequent rules category has a trigger threshold of three or more rules, wherein the known rules category has a trigger threshold of two or more rules, wherein the last 7 days location rules category has a trigger threshold of four or more rules, wherein the last 7 days latitude and longitude rules category has a trigger threshold of three or more rules, wherein the last 7 days device rules category has a trigger threshold of four or more rules, unfamiliar rules category has a trigger threshold of zero rules, wherein the login familiarity rules category has a trigger threshold of one or more rules, wherein the usual words-per-minute (WPM) rules category has a trigger threshold of two or more rules, wherein the anomalous input rules category has a trigger threshold of zero rules, wherein the fraud associated rules category has a trigger threshold of zero rules, wherein the frequent anomalous rules category has a trigger threshold of zero rules, wherein the known anomalous rules category has a trigger threshold of zero rules, wherein the last 7 days anomalous device rules category has a trigger threshold of zero rules, wherein the last 7 days anomalous latitude and longitude rules category has a trigger threshold of zero rules, wherein the last 7 days anomalous location rules category has a trigger threshold of zero rules, and wherein the anomalous login familiarity rules category has a trigger threshold of zero rules.

7. The server of claim 6, wherein the second identification response from the additional user identification indicates the user is a same user when the plurality of categories has a first combined total of greater than or equal to a first number of categories triggered, and wherein the second identification response from the additional user identification indicates the user is a different user when the plurality of categories has a second combined total of less than or equal to a second number categories triggered that is less than the first number.

8. A method for identifying a user, the method comprising:
   detecting, with an electronic processor, an access request by the user of a user interface device;
   retrieving, with the electronic processor, a plurality of input profile records associated with the user from an input profile record repository in a memory in response to detecting the access request of the user, each of the plurality of input profile records including a plurality of user inputs from the user interacting with a webpage or a mobile application;
   performing, with the electronic processor, an identification of the user with one or more passive biometrics models and the plurality of input profile records that are retrieved;
   generating, with the electronic processor, an identification response and an additional identification request based on an outcome of the identification of the user with the one or more passive biometrics models and the plurality of input profile records that are retrieved;

controlling, with the electronic processor, a communication interface to transmit the additional identification request to a second server via a network;

receiving, with the electronic processor, a second identification response from the second server via the communication interface and the network; and generating, with the electronic processor, a blended response by modifying one or more characteristics of the identification response with the second identification response, the blended response indicating the identification of the user, wherein the additional identification request indicates to the second server that the outcome of the identification of the user is a failed identification of the user, and wherein the additional identification request is a request for an additional user identification based on device identification rules.

9. The method of claim 8, wherein the additional identification request indicates to the second server that the outcome of the identification of the user is a successful identification of the user, and wherein the additional identification request is a request for an additional user identification based on device identification rules that enhances the successful identification of the user.

10. The method of claim 8, wherein the device identification rules are divided into a plurality of categories, wherein the additional user identification is based on all of the plurality of categories of the device identification rules that are triggered, and wherein modifying the one or more characteristics of the identification response with the second identification response further includes adjusting biometric thresholds of the one or more passive biometrics models based on the categories of the device identification rules that are triggered.

11. The method of claim 8, wherein the device identification rules are divided into a plurality of categories, and wherein the additional user identification is based on all of the plurality of categories of the device identification rules that are triggered.

12. The method of claim 11, wherein the plurality of categories includes a frequent rules category, a known rules category, last 7 days location rules category, last 7 days latitude and longitude rules category, last 7 days device rules category, unfamiliar rules category, login familiarity rules category, usual words-per-minute (WPM) rules category, anomalous input rules category, fraud associated rules category, frequent anomalous rules category, known anomalous rules category, last 7 days anomalous device rules category, last 7 days anomalous latitude and longitude rules category, last 7 days anomalous location rules category, and an anomalous login familiarity rules category.

13. The method of claim 12, wherein the frequent rules category has a trigger threshold of three or more rules, wherein the known rules category has a trigger threshold of two or more rules, wherein the last 7 days location rules category has a trigger threshold of four or more rules, wherein the last 7 days latitude and longitude rules category has a trigger threshold of three or more rules, wherein the last 7 days device rules category has a trigger threshold of four or more rules, unfamiliar rules category has a trigger threshold of zero rules, wherein the login familiarity rules category has a trigger threshold of one or more rules, wherein the usual words-per-minute (WPM) rules category has a trigger threshold of two or more rules, wherein the anomalous input rules category has a trigger threshold of zero rules, wherein the fraud associated rules category has a trigger threshold of zero rules, wherein the frequent anomalous rules category has a trigger threshold of zero rules, wherein the known anomalous rules category has a trigger threshold of zero rules, wherein the last 7 days anomalous device rules category has a trigger threshold of zero rules, wherein the last 7 days anomalous latitude and longitude rules category has a trigger threshold of zero rules, wherein the last 7 days anomalous location rules category has a trigger threshold of zero rules, and wherein the anomalous login familiarity rules category has a trigger threshold of zero rules.

14. The method of claim 13, wherein the second identification response from the additional user identification indicates the user is a same user when the plurality of categories has a first combined total of greater than or equal to a first number of categories triggered, and wherein the second identification response from the additional user identification indicates the user is a different user when the plurality of categories has a second combined total of less than or equal to a second number of categories triggered that is less than the first number.

15. A system comprising:
a first server; and
a second server,
wherein the first server includes
  a communication interface configured to communicate with the second server via a network;
  a memory including an input profile record (IPR) program, an IPR repository, and
a dual-layer identification service; and
  an electronic processor, when executing the IPR program, configured to:
    detect an access request by a user of a user interface device, and
    retrieve a plurality of input profile records associated with the user from an input profile record repository in the memory in response to detecting the access request of the user, each of the plurality of input profile records including a plurality of user inputs from the user interacting with a webpage or a mobile application,
  wherein, when executing the dual-layer identification server, the electronic processor configured to:
    perform an identification of the user with one or more passive biometrics models and the plurality of input profile records that are retrieved,
    generate an identification response and an additional identification request based on an outcome of the identification of the user with the one or more passive biometrics models and the plurality of input profile records that are retrieved,
    control the communication interface to transmit the additional identification request to the second server via the network,
    receive a second identification response from the second server via the communication interface and the network, and
    generate a blended response by modifying one or more characteristics of the identification response with the second identification response, the blended response indicating the identification of the user,
  wherein the additional identification request indicates to the second server that the outcome of the identification of the user is a failed identification of the user, and wherein the additional identification request is a request for an additional user identification based on device identification rules.

16. The system of claim 15, wherein the additional identification request indicates to the second server that the outcome of the identification of the user is a successful identification of the user, and wherein the additional identification request is a request for an additional user identification based on device identification rules that enhances the successful identification of the user.

17. The system of claim 15, wherein the device identification rules are divided into a plurality of categories, wherein the additional user identification is based on all of the plurality of categories of the device identification rules that are triggered, and wherein modifying the one or more characteristics of the identification response with the second identification response further includes adjusting biometric thresholds of the one or more passive biometrics models based on the categories of the device identification rules that are triggered.

18. The system of claim 17, wherein the device identification rules are divided into a plurality of categories, and wherein the additional user identification is based on all of the plurality of categories of the device identification rules that are triggered.

19. The system of claim 18, wherein the plurality of categories includes a frequent rules category, a known rules category, last 7 days location rules category, last 7 days latitude and longitude rules category, last 7 days device rules category, unfamiliar rules category, login familiarity rules category, usual words-per-minute (WPM) rules category, anomalous input rules category, fraud associated rules category, frequent anomalous rules category, known anomalous rules category, last 7 days anomalous device rules category, last 7 days anomalous latitude and longitude rules category, last 7 days anomalous location rules category, and an anomalous login familiarity rules category.

20. The system of claim 19, wherein the frequent rules category has a trigger threshold of three or more rules, wherein the known rules category has a trigger threshold of two or more rules, wherein the last 7 days location rules category has a trigger threshold of four or more rules, wherein the last 7 days latitude and longitude rules category has a trigger threshold of three or more rules, wherein the last 7 days device rules category has a trigger threshold of four or more rules, unfamiliar rules category has a trigger threshold of zero rules, wherein the login familiarity rules category has a trigger threshold of one or more rules, wherein the usual words-per-minute (WPM) rules category has a trigger threshold of two or more rules, wherein the anomalous input rules category has a trigger threshold of zero rules, wherein the fraud associated rules category has a trigger threshold of zero rules, wherein the frequent anomalous rules category has a trigger threshold of zero rules, wherein the known anomalous rules category has a trigger threshold of zero rules, wherein the last 7 days anomalous device rules category has a trigger threshold of zero rules, wherein the last 7 days anomalous latitude and longitude rules category has a trigger threshold of zero rules, wherein the last 7 days anomalous location rules category has a trigger threshold of zero rules, and wherein the anomalous login familiarity rules category has a trigger threshold of zero rules.

* * * * *